United States Patent
Burke et al.

(10) Patent No.: US 8,738,681 B1
(45) Date of Patent: May 27, 2014

(54) HIERARCHICAL COOPERATIVE STORAGE SERVICES

(75) Inventors: Barry A. Burke, Tyngsboro, MA (US); Bradford B. Glade, Harvard, MA (US); Kenneth J. Taylor, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 674 days.

(21) Appl. No.: 12/977,295

(22) Filed: Dec. 23, 2010

(51) Int. Cl.
*G06F 15/16* (2006.01)
(52) U.S. Cl.
USPC .......................................................... 709/201
(58) Field of Classification Search
USPC ........................................ 709/201, 223, 226
See application file for complete search history.

(56) References Cited

U.S. PATENT DOCUMENTS

| | | | |
|---|---|---|---|
| 2008/0256294 A1* | 10/2008 | Gill | 711/117 |
| 2010/0313200 A1* | 12/2010 | Rozee et al. | 718/1 |
| 2011/0202795 A1* | 8/2011 | Marathe et al. | 714/23 |
| 2011/0314246 A1* | 12/2011 | Miller et al. | 711/170 |

\* cited by examiner

*Primary Examiner* — Jason Recek
(74) *Attorney, Agent, or Firm* — Krishnendu Gupta; Joseph D'Angelo

(57) ABSTRACT

A method, system, and program product for enabling a virtual storage layer to offer array based extent services, the virtual storage layer communicatively coupled to one or more storage mediums, the method comprising determining for the one or more storage mediums, the services offered by the storage mediums, and enabling extent based services at the virtual service layer by combining the services offered by the one or more storage mediums to create new services and by providing a set of services at the virtual service layer.

20 Claims, 20 Drawing Sheets

HIERARCHICAL COOPERATIVE STORAGE SERVICES

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to managing and analyzing data in a data storage environment, and more particularly to a system and method for managing physical and logical components of storage area networks.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

To leverage the value of MSS, these are typically networked in some fashion, Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over a Fibre Channel switching fabric using encapsulated SCSI protocols.

Each network type has its advantages and disadvantages, but SAN's are particularly noted for providing the advantage of being reliable, maintainable, and being a scalable infrastructure but their complexity and disparate nature makes them difficult to centrally manage. Thus, a problem encountered in the implementation of SAN's is that the dispersion of resources tends to create an unwieldy and complicated data storage environment. Reducing the complexity by allowing unified management of the environment instead of treating it as a disparate entity would be advancement in the data storage computer-related arts. While it is an advantage to distribute intelligence over various networks, it should be balanced against the need for unified and centralized management that can grow or scale proportionally with the growth of what is being managed. This is becoming increasingly important as the amount of information being handled and stored grows geometrically over short time periods and such environments add new applications, servers, and networks also at a rapid pace.

SUMMARY OF THE INVENTION

A method, system, and program product for enabling a virtual storage layer to offer array based extent services, the virtual storage layer communicatively coupled one or more storage mediums, the method comprising determining for the one or more storage mediums, the services offered by the storage mediums, and enabling extent based services at the virtual service layer by combining the services offered by the one or more storage mediums to create new services and by providing a set of services at the virtual service layer.

BRIEF DESCRIPTION OF THE DRAWINGS

The above and further advantages of the present invention may be better understood by referring to the following description taken into conjunction with the accompanying drawings in which.

DETAILED DESCRIPTION

Figure 1:
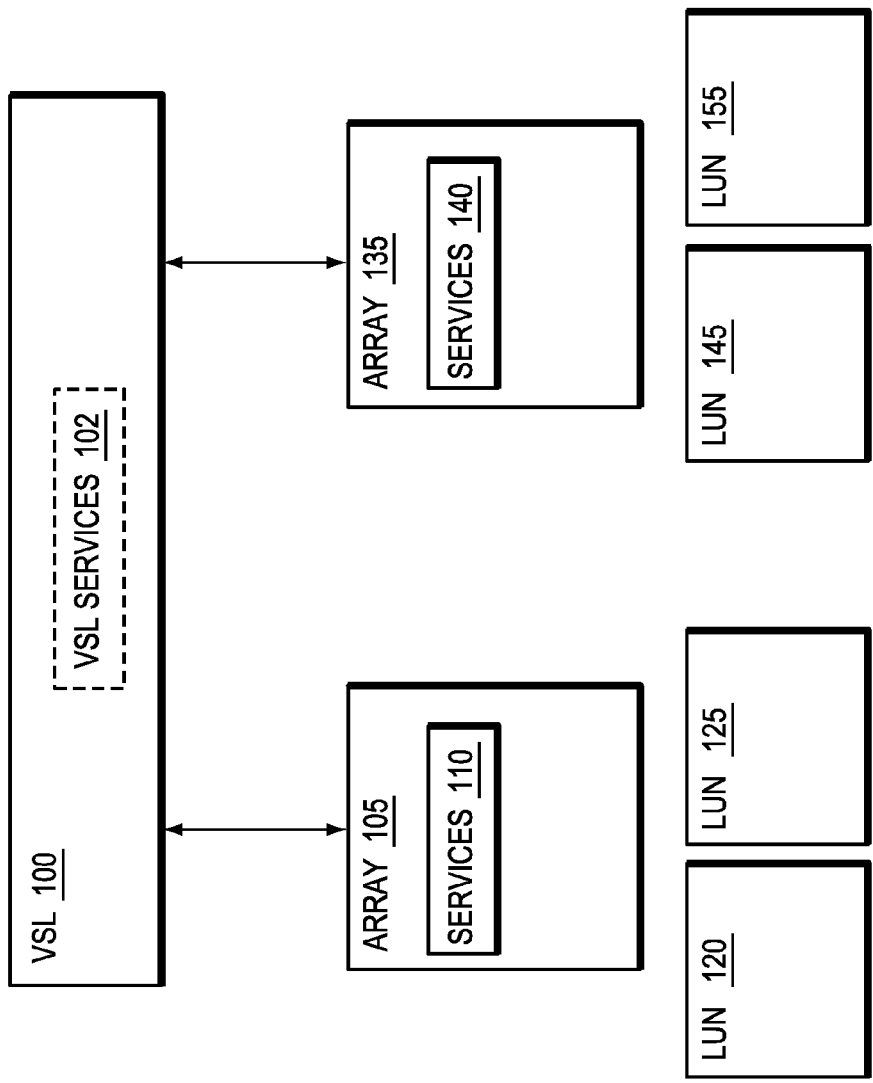
FIG. 1 is a simplified embodiment of a virtual storage layer and storage arrays, in accordance with an aspect of the current invention.

In some embodiments, the current disclosure enables a method and mechanism for leveraging and extending storage array features in a virtual storage layer. Typically, SAN-based storage arrays provide many features that are accessed, controlled, and leveraged by host-based software and applications. Generally, this software and these applications become dependent on these storage services for their daily operation. Conventionally, businesses today have critical business operations that use such applications and require full operation of these applications on a 24 hour basis each day of the year. Usually, since technology eventually wears out and needs to be replaced solutions have been developed to allow such equipment to be replaced without requiring that business applications observe any downtime.

Conventional virtual storage has been used as one such solution to the aforementioned problem of transparently replacing storage without impacting availability of storage. However, to date, virtual storage layers have taken the approach of intercepting and implementing storage array functionality, effectively relegating the storage behind the virtual storage layer to nothing more than protected storage (aka RBOD), or a least-common denominator of provided services. As a result, general investments in features and functions offered by the storage platforms themselves are typically deprecated by current approaches. Thus, typical virtual-storage solutions to date have limited and isolated business applications from many of the advanced features available on the storage arrays, which may prevent access to these services and reducing the value of the underlying purchased asset. In some embodiments, the instant disclosure enables methods and mechanisms for combining the properties of one or more virtual storage layers with the services provided by a storage array to create hierarchical cooperative storage services. In certain embodiments there may be a Server-Virtual Storage Appliance-Storage Array-Virtualized storage behind the Array.

In some embodiments, there may be any number of physical or logical layers in the hierarchical service model. In certain embodiments, each layer may be aware of the capabilities and services offered by the other layers to which it can communicate directly. In further embodiments, a particular layer, such as a virtual layer may create services to be offered by combining the services of other service layers.

In some embodiments, the instant disclosure enables extent-based services at a virtual level. In other embodiments, the current disclosure enables service composition and decomposition at a virtual level. In alternative embodiments, the current disclosure enables service extension at a virtual level. In further embodiments, the instant disclosure enables service declaration and introspection at a virtual level.

A description of hinting and some techniques associated with hinting may be described in the patent applications titled STORAGE INTEGRATION PLUGIN FOR VIRTUAL SERVERS and A METHOD FOR DYNAMIC MANAGEMENT OF SYSTEM RESOURCES THROUGH APPLICATION HINTS with patent application Ser. Nos. 12/751,093 and 12/827,092 which are hereby incorporated by reference in their entirety.

A description of storage mediums of different speed and storage tiering and some techniques associated thereto may be described in the patent applications titled FACILITATING DATA MIGRATION BETWEEN TIERS and FINE GRAINED TIERED STORAGE WITH THIN PROVISIONING with patent application Ser. Nos. 12/494,622 and 11/823,156 which are hereby incorporated by reference in its entirety.

Service Discovery, Declaration, and Assertion

In some embodiments, a higher-level controlling entity such as a virtual-storage layer may consume the extent-based services of underlying storage arrays and compose these services into a new higher-level service. In other embodiments, the virtual storage layer may discover the services offered by a storage array by interrogating the storage array. In certain embodiments, the storage array may declare the services offered by the array.

In alternative embodiments, an interface may be introduced to allow the storage array to apply extent based services in the context of a transaction that is coordinated by an external controlling entity such as the virtual storage layer. In at least some embodiments, the transactional interface may enable individual services of the storage arrays to be combined and composed by the higher controlling layer with semantics that support the ability to achieve atomicity guarantees from the higher-level service.

In other embodiments, the transactional interface may ensure that operations such as fracturing of a mirror occur atomically with respect to the virtual extent, whereby either both lower level extent mirrors are fractured or neither are fractured. In further embodiments, the higher-layer controlling entity (e.g. the virtual storage layer) may use dynamic discovery of service capabilities from a storage array to dynamically determine which services the storage array supports. In some embodiments, the determination may allow the controlling entity to determine which services can be composed or passed through to the back-end storage array and which services need to be implemented directly within the controlling layer itself.

In further embodiments, to complement service discovery, a service provider such as the storage array or virtual storage layer may declare the set of extent based services that it supports. In alternative embodiments, legacy service providers without such an interface may be supported through proxy declaration agents, or static service tables. In certain embodiments, the extent-based services of lower-level service providers such as a storage array may be extended and enhanced by higher-level services. In other embodiments, if a lower-level storage array does not provide encryption services for extents, this service may be added by the higher-layer service and the set of extent service offerings extended with this additional capability. In some embodiments, the virtual service layer may combine the services offered by an array with its own set of services to offer services not otherwise available at the array level.

In some embodiments, the virtual service layer may enable T10 Block Zero, Full Copy, UNMAP, Persistent Reservation, including offering these services for arrays that may otherwise not offer these functions. In certain embodiments, the VSL may pass through and/or rewrite the host requests to leverage the back-end capabilities if the array does offer these capabilities. In further embodiments, the virtual service layer may offer local and remote replication, consistency groups, virtual/thin provisioning, auto-tiering, and data compression.

Array Capabilities

Figure 2:
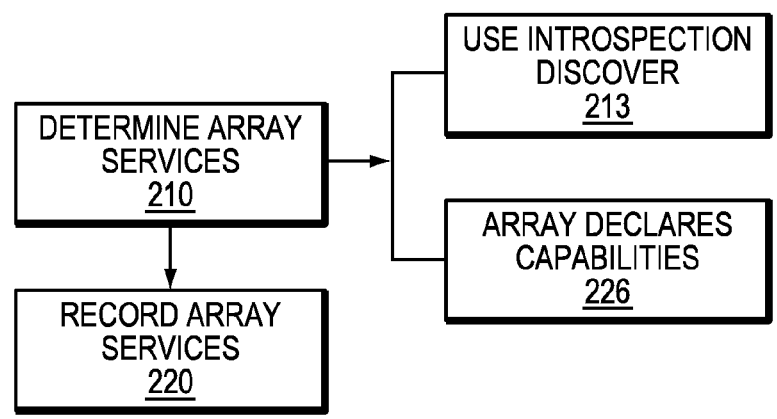
FIG. 2 is a simplified method of determining array services, in accordance with an aspect of the current invention.

Refer now to the example embodiments of FIGS. 1 and 2. In FIG. 1 there is a virtual service layer 100, two storage arrays 105 and 135, and each storage array has two LUNs 120 125, and 145, 155 respectively. It may be determined what services, 110, 140 each of the arrays 105, 135 have (step 210). In some embodiments, VSL 100 may use introspection to determine what services each array, 105, 135 have (step 213). In other embodiments arrays 105, 135 may declare what services they have (step 226). VSL 100 may record what services the arrays have (step 220). Note, in further embodiments, the storage arrays may not have and may not offer any services.

Figure 3:
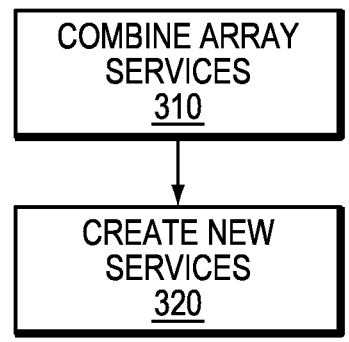
FIG. 3 is a simplified method of creating array services, in accordance with an aspect of the current invention.

Refer now to the example embodiments of FIGS. 2 and 3. VSL 100 may combine array services offered by the arrays 103,135 (step 310). VSL 100 may use these services to create new services offered at the VSL 100 (step 320). In other embodiments, VSL 100 may create new services without using the services from the arrays.

In some embodiments, a service offered by VSL 100 may be a combination of the services offered by the arrays 105, 140. In particular embodiments, arrays 105 and 135 may expose extents and offer encryption. The VSL 100 may combine these extents into a virtual extent and offer encryption for the virtual extent. In other embodiments, the arrays 105, 140 may not offer encryption, but VSL 100 may offer encryption by encrypting the information before it written to the physical extent on the storage array.

Extent-Based Services

Typically, virtual storage may not provide access to or the ability to manipulate extents on physical storage to provide the same level of services as the physical array itself. In some embodiments, the current disclosure enables an extent based service added to a storage array to enable the ability of a higher-level controlling layer (e.g. the virtual storage layer) to manipulate ranges of a storage device using these services. In some embodiments, the virtual storage layer may define an extent object to be a subset of a storage device. In other embodiments, the virtual storage layer may create a mirroring relationship between it and another storage extent on the same storage-array. In further embodiments, the virtual storage layer may move the data from the source extent to a new storage extent within the storage array changing the structure of the internal storage device.

In certain embodiments, the current disclosure may enable establishing a local mirror relationship between two local extents within the storage array, between extents on two storage arrays, establishing a space-saving point-in-time snapshot of an extent, zeroing the contents of an extent, replacing the contents of an extent with a pattern, replacing the contents of an extent with the data from another extent, establishing a journaled history for an extent, moving the storage extent from one location to another within the storage array, establishing a remote mirror relationship between a local storage extent and a remote storage extent serviced by a second storage array, compression of an extent, encryption of an extent, and application of a dynamically loadable program to an extent.

In further embodiments, the current disclosure enables services on existing storage arrays where sub-device extent-based services may not already exist. In these embodiments, extent-based services are applied to a storage device as a whole. Services of the existing storage arrays may be consumed as services that apply to storage extents, where the storage extent may be considered the entire range of a storage device on the array.

In certain embodiments, a virtual extent may be created by concatenating two individual extents exported by different storage arrays. In further embodiments, a mirrored virtual extent may be created by composing the extent mirroring services from each array and exposing an extent mirror service from this higher controlling layer for the virtual storage extent. In a particular embodiment, a virtual extent may be created by mirroring two extents exposed by one or more storage arrays. In this embodiment, the virtual storage layer may have been exposed to two separate extents, A and B. In this embodiment, the virtual storage layer may combine these extents implement mirroring functionality for a virtual extent which is composed from A & B.

For example referring again to the sample embodiment of FIG. 1, a service offered by VSL 100 may be a combination of the services offered by the arrays 105, 140. In particular embodiments, arrays 105 and 135 may expose extents and offer encryption. The VSL 100 may combine these extents into a virtual extent and offer encryption for the virtual extent. In other embodiments, the arrays 105, 140 may not offer encryption; but VSL 100 may offer encryption by encrypting the information before it is written to the extent.

Mirroring

Figure 4:
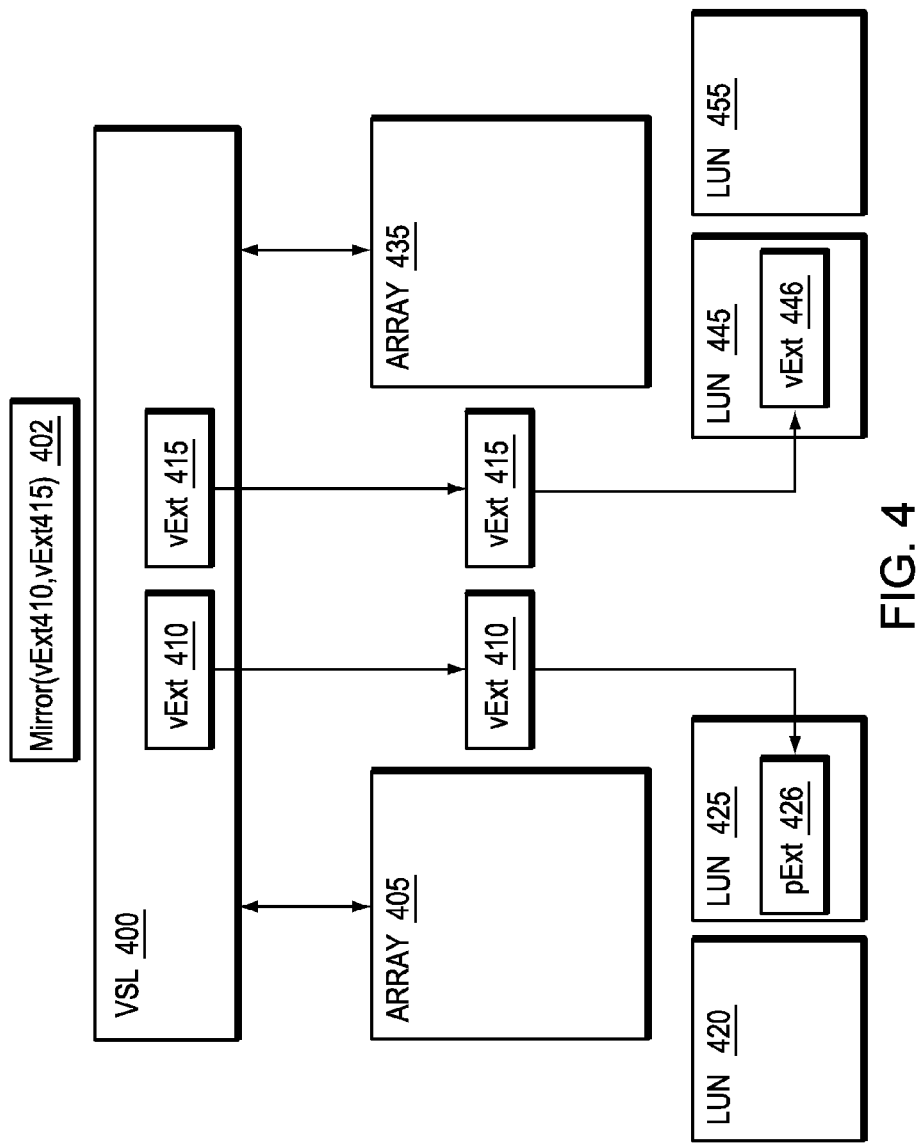
FIG. 4 is a simplified embodiment of creating a mirror at a virtual storage layer, in accordance with an aspect of the current invention.
Figure 5:
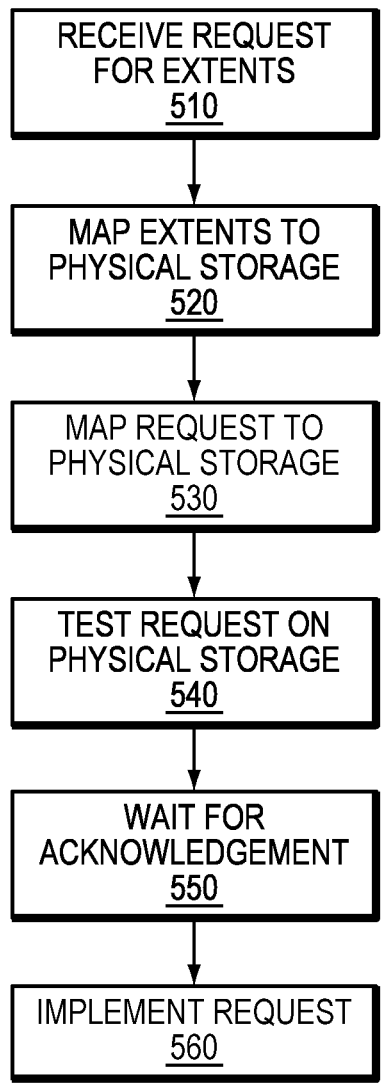
FIG. 5 is a simplified method of implementing array services, in accordance with an aspect of the current invention.

Refer now to the example embodiments of FIGS. 4 and 5. FIG. 4 represents a simplified embodiment of a Virtual storage layer (VSL) 400 and storage arrays 405 and 435. The storage arrays may have LUNs, 420, 425 and 445, 455 respectively, and may expose physical extents 426 and 446. VSL 400 may expose two virtual extents 410 and 415. Virtual extents 410 and 415 may map to physical extents 426 and 446.

VSL 400 may offer a service to create a mirror. VSL 400 may receive a request to create a mirror out of the virtual extents, 410, 415 (step 510). VSL 400 may map the virtual extents 410, 415 to the underlying physical extents 426 and 446 (step 520). VSL 400 may map the request to create a mirror to the functionality on the storage arrays 420 and 425. In this embodiment, neither storage array 405, 435 offers the ability to create a mirror across a different storage array. To create a mirror, VSL 400 must implement the logic at the virtual service layer. Thus, if a write is received for the virtual mirror, the write must be sent to both extents.

Figure 6:
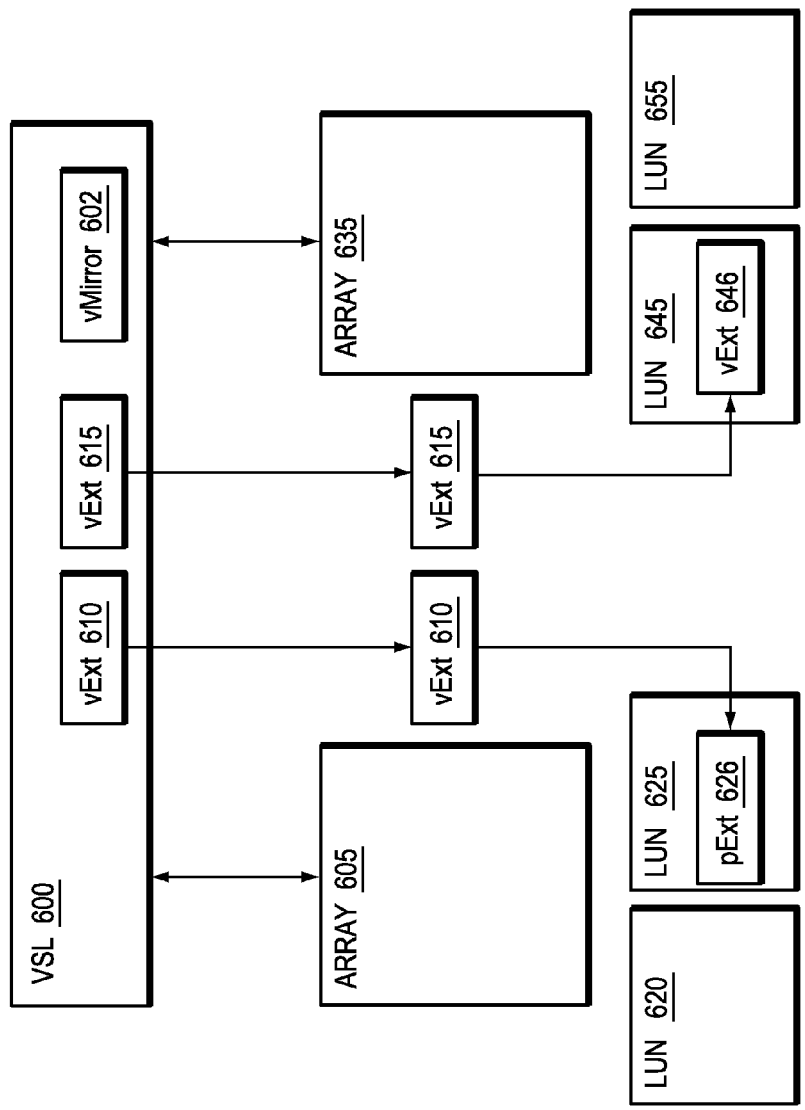
FIG. 6 is a simplified embodiment of creating a mirror at a virtual storage layer, in accordance with an aspect of the current invention.

VSL 400 tests the request to create the mirror on the virtual storage (step 540). As part of the test, VSL 400 may request access to and ensure that physical extents 426 and 446 are able to be used for this request. VSL 400 may send a request reserve the extents 426 and 446 for this request. VSL 400 may wait to receive an acknowledgement that the extents are available and that the extents 426 and 446 may be reserved (step 550). VSL 400 may implement the request for a virtual mirror, which may include executing the reserve request (step 560). Refer now to the sample embodiment of FIG. 6 which illustrates a sample virtual mirror 602 offered by VSL 600. Virtual mirror 602 is composed of virtual extents 610, 615. Virtual extents 610, 615 may to physical extents 626, 646.

Figure 7:
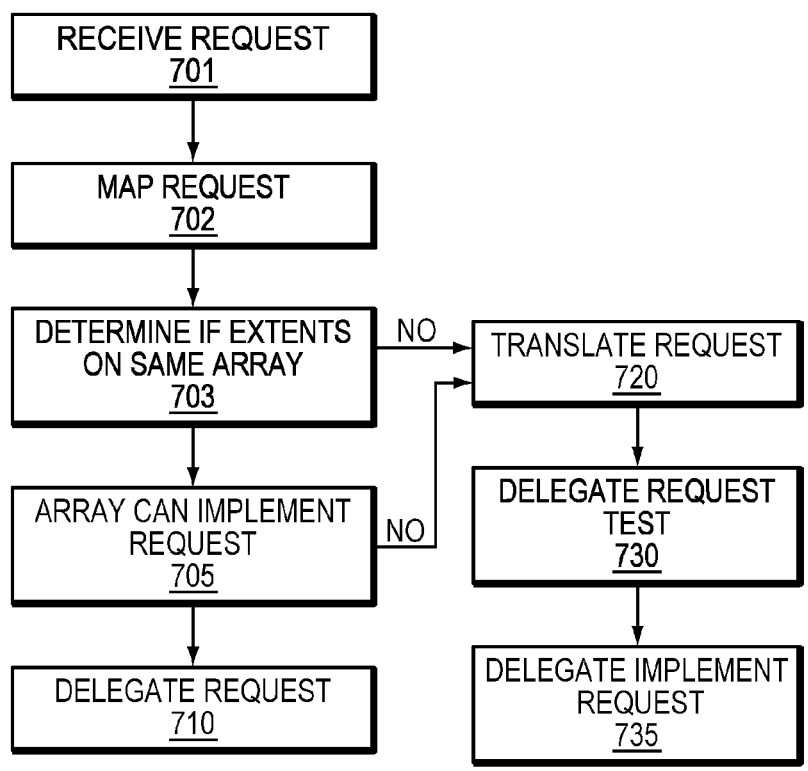
FIG. 7 is an alternative simplified method of implementing array services, in accordance with an aspect of the current invention.
Figure 8:
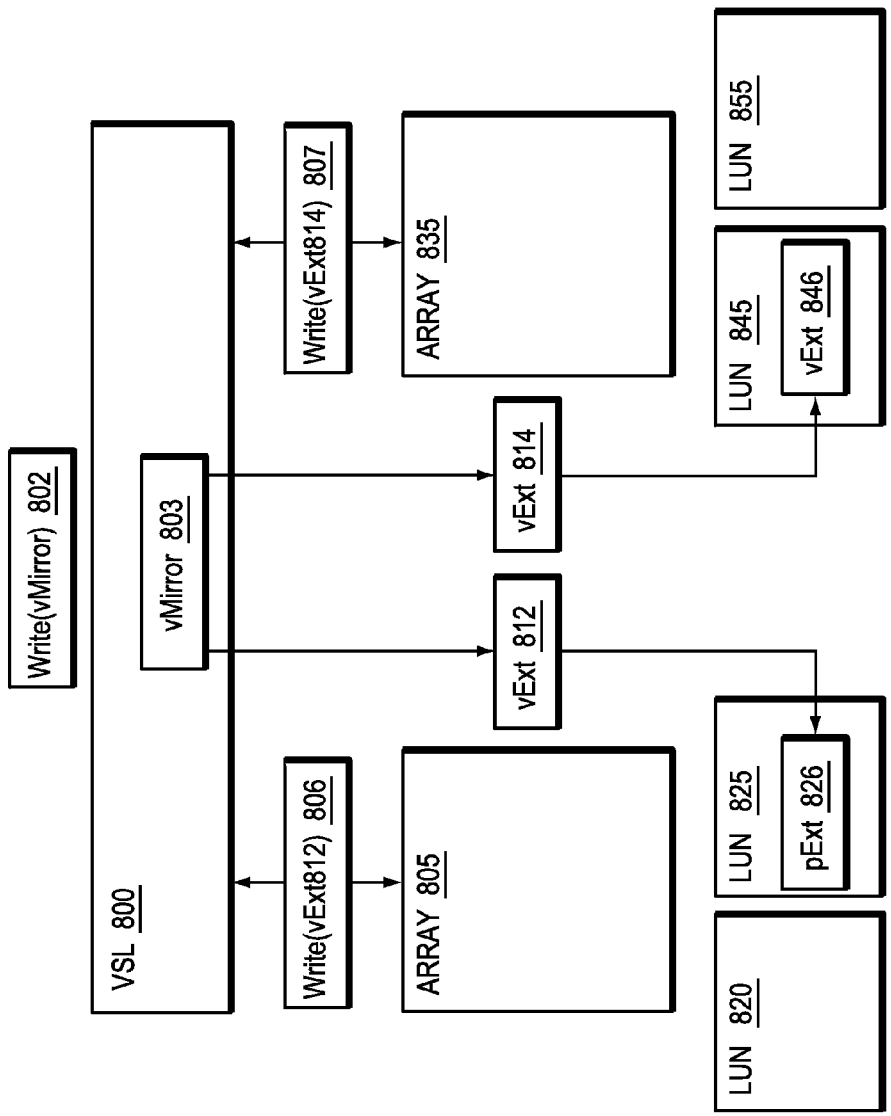
FIG. 8 is a simplified embodiment of writing to a mirror presented at a virtual storage layer, in accordance with an aspect of the current invention.

Refer now to the sample embodiments of FIGS. 7 and 8. FIG. 8 illustrates a write request 802 to virtual mirror 803 on VSL 800 (step 701). It is determined that virtual extents 812 and 814 map to physical extents 826 and 846, respectively (step 702). It is determined that the extents are not on the same array (step 703). It is determined that the write to the mirror needs to be translated into a request that the storage arrays 805, 835 can implement (step 715). The write to the mirror 802 is translated at VSL 800 to be two write requests 806 and 807 to the two arrays 805 and 835 (step 720). The write requests 806 and 807 are tested (step 730). Upon successful completion of the test, the writes are implemented (step 735).

In most embodiments, with respect to service offered at the VSL, such as a write to a virtual mirror, it may be necessary to coordinate operations on each array to ensure that each array can execute the request before the requests are executed. This may be because if one array can execute the request, but the other cannot, the request should return a failure status instead of being implemented on only one storage array. Thus, in most embodiments where the virtual service layer is implementing an extent based service over multiple storage arrays, the virtual service layer may execute coordinating commands, i.e. as determining whether each sub-command would succeed before executing the command created at the virtual storage level. In a particular embodiment, reserving space may be each storage array before a write is made to that space.

Figure 9:
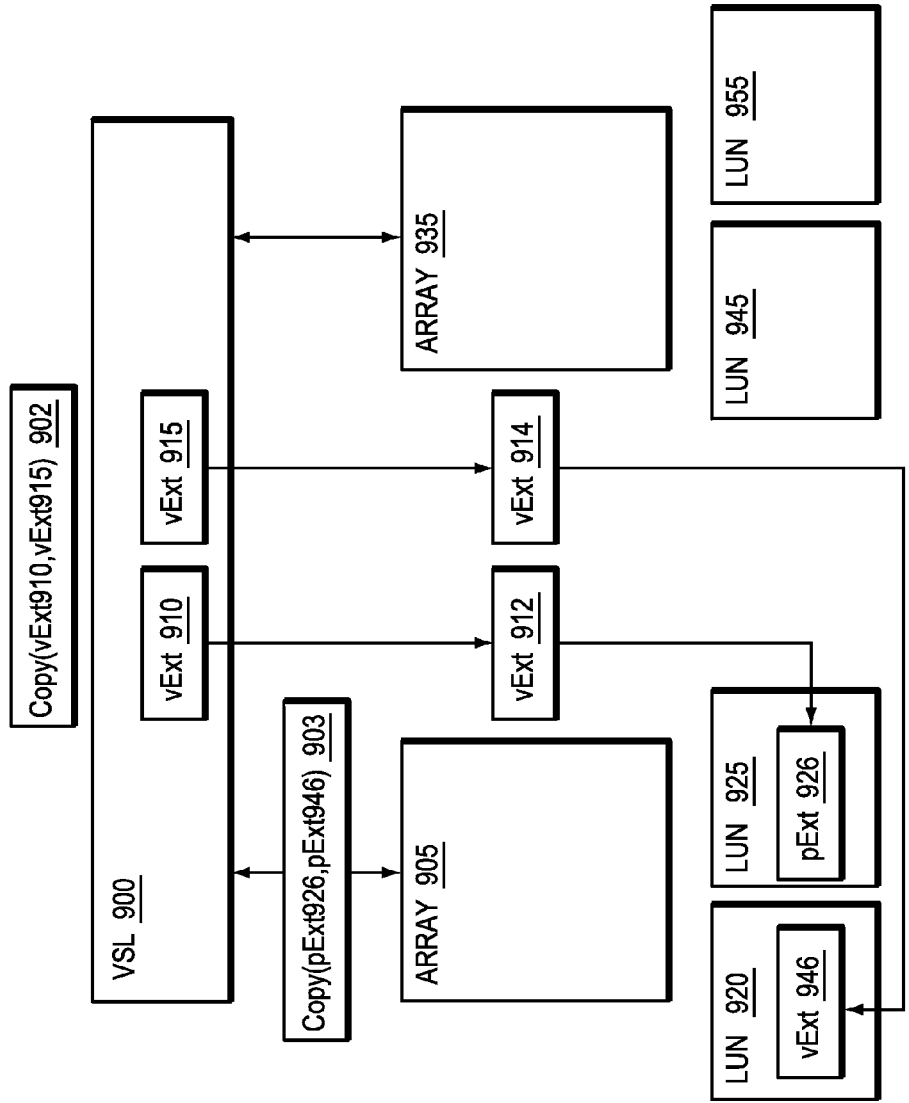
FIG. 9 is a simplified embodiment of copying an extent request at a virtual storage layer, in accordance with an aspect of the current invention.

Refer now to the sample embodiments of FIGS. 7 and 9. FIG. 9 illustrates a request 902 to copy virtual extent 910 to virtual extent 915. The VSL 900 maps the extents of the copy request (step 702). In the embodiment of FIG. 9, VSL 900 determines that the physical extents, 926, 946, corresponding to the virtual extents are exposed by array 905 (step 703). VSL 900 determines that array 905 has the capability to copy between extents and can implement the copy request (step 705). VSL 900 delegates copy request 903 to be handled by array 905 (step 710).

Figure 10:
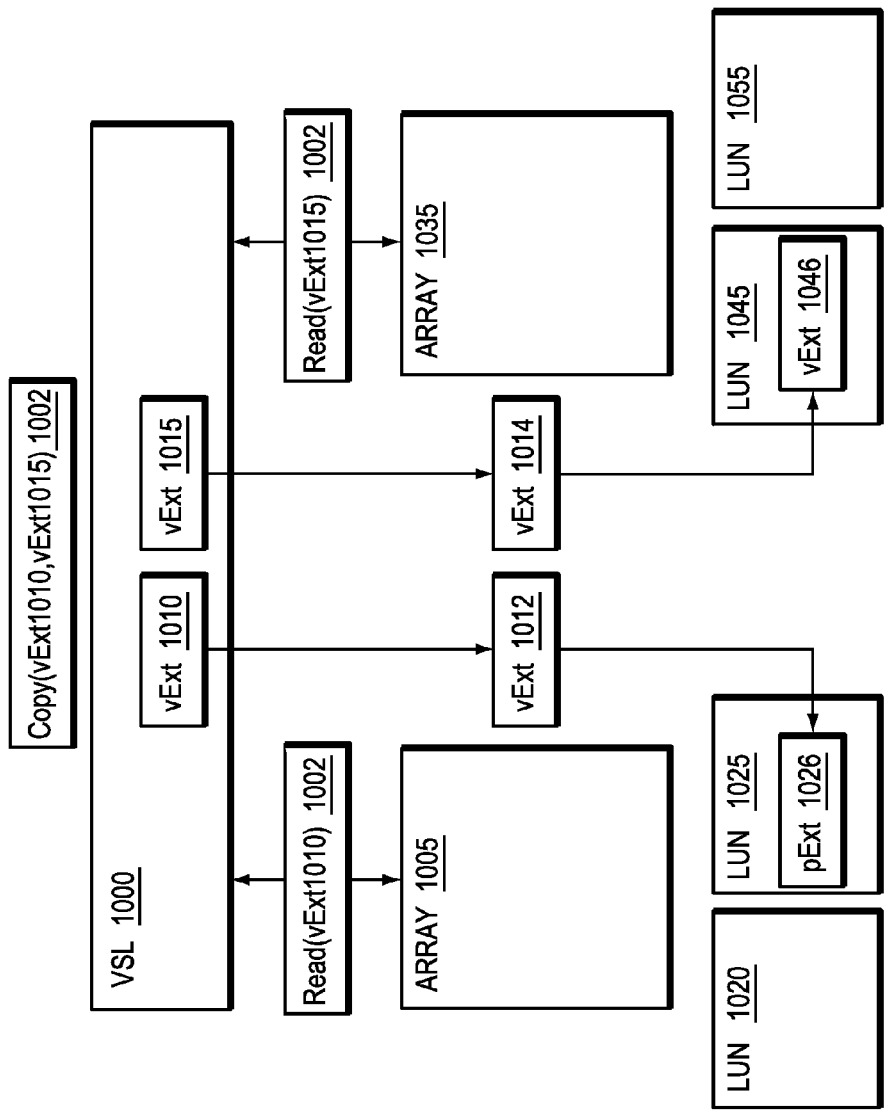
FIG. 10 is a simplified alternative embodiment of copying an extent request at a virtual storage layer, in accordance with an aspect of the current invention.

Refer now to the sample embodiments of FIGS. 7 and 10. FIG. 10 illustrates a request 1002 to copy virtual extent 1010 to virtual extent 1015. The VSL 1000 maps the extents of the copy request (step 702). In the embodiment of FIG. 10, VSL 1000 determines that the physical extents, 1026, 1046, corresponding to the virtual extents are exposed by two arrays 1005, 1035 (step 703). VSL 1000 determines that arrays, can not handle the request (step 705). VSL 1000 creates a translation of the request to requests to be handled by the storage arrays 1005 and 1035 (step 720). VSL 1000 maps the copy extent command by using array 1005 to read the extent and array 1035 to write the other extent. VSL 1000 implements the requests (steps 730, 735).

Figure 11:
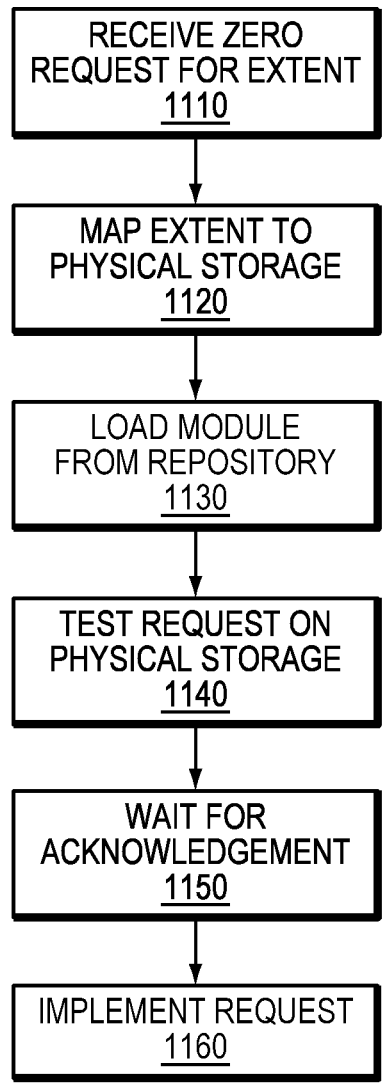
FIG. 11 is a simplified method of implementing a zeroing request for a virtual extent, in accordance with an aspect of the current invention.
Figure 12:
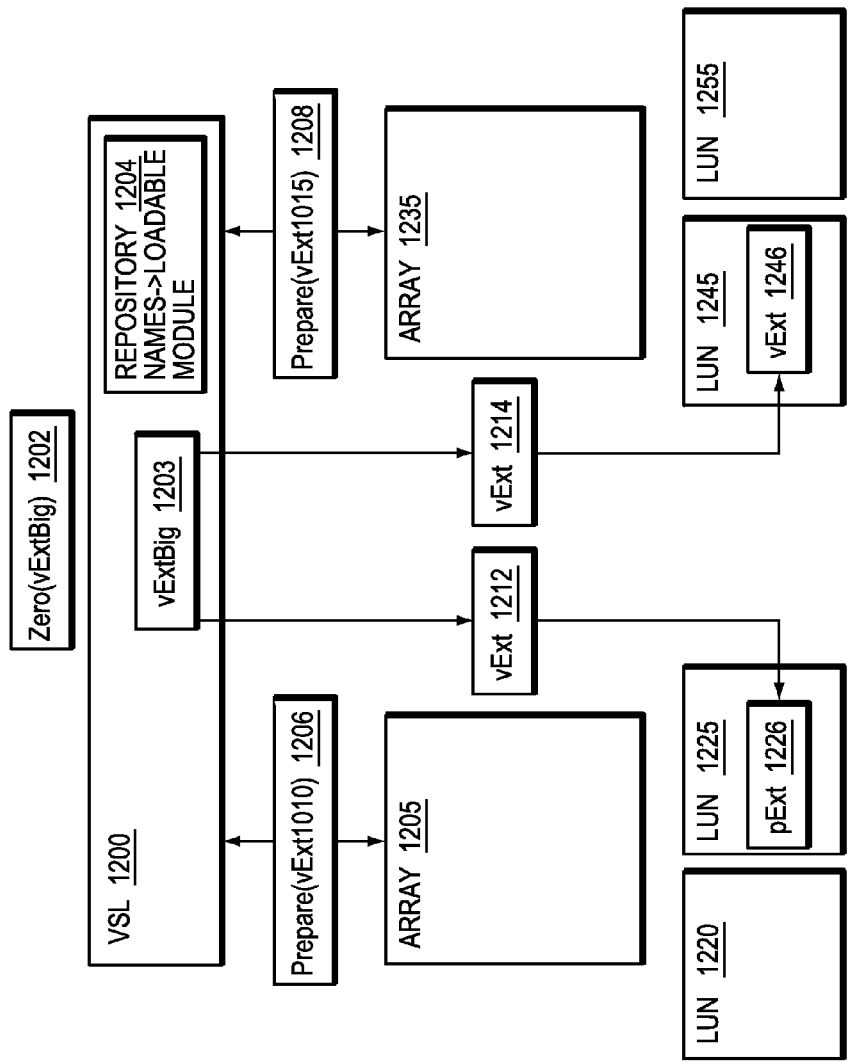
FIG. 12 is a simplified alternative embodiment of zeroing an extent at a virtual storage layer, in accordance with an aspect of the current invention.
Figure 13:
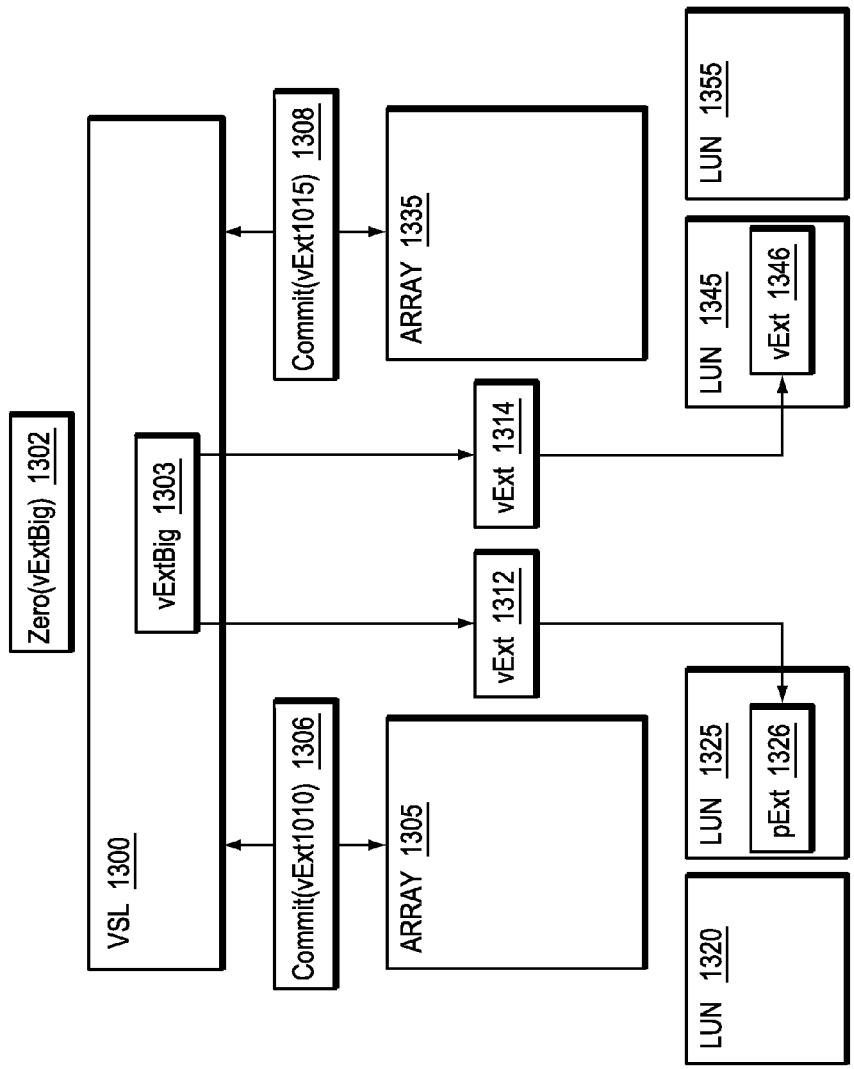
FIG. 13 is an alternative simplified alternative embodiment of zeroing an extent at a virtual storage layer, in accordance with an aspect of the current invention.

Refer now to the example embodiments of FIGS. 11-13. In these embodiments, the VSL 1200 has received a request 1202 to zero a particular extent 1203 (Step 1110). In these embodiments, the logic to perform this zeroing may be stored in a repository 1203 as a loadable module at the VSL 1200. The virtual extent 1203 in the request 1202 to zero the extent 1203 may be made up of two physical extents, 1226, 1246. VSL 1200 may map virtual extent 1203 to the two physical extents 1226 and 1246 (step 1120). VSL 1200 may load the module from the repository 1203 (step 1130). In some embodiments, the VSL may send a request to zero the extent if the array supports this service. In other embodiments, the Virtual service layer may transmit a write request consisting of zeros to enable the zero request at the Virtual Storage layer level.

Data Integrity

I/O is typically performed on a "block" basis, where block sizes may vary. Conventionally, to help protect blocks from undetected corruption, the notion of a DIF (Data Integrity Field) has been created (and standardized by IEEE T10 SCSI committee). Generally, the DIF is typically additional bytes of data sent along with each block, generated as a CRC for the block with perhaps a salt that includes the target/intended/actual Logical Block Address (LBA). Typically, data storage devices may not support this type of data integrity. Further, supported data integrity usually does not usually extend across all levels of the storage.

In some embodiments, the virtual service layer may also implement data integrity services. In certain embodiments, the data integrity may include host-generated Data Integrity Fields that flow with the data block to the actual storage device (disk). In most embodiments, the data integrity may serve to verify that the block has not changed and in fact has been returned from the requested LBA. In at least some embodiments, the integrity service can be checked along the hierarchy if the back-end storage arrays support it, and enabled by the VSL if not supported by the array.

In some embodiments, the VSL may implement data integrity. In certain embodiments, for hosts that don't generate DIFs natively, and arrays that can handle them directly, the VSL may generate the DIF upon reception of a write, and validate it on each read, thereby reducing the probability of potential corruption between the back-end array and the front-end of the VSL. In other embodiments, for arrays that don't support native DIF, the VSL could generate the DIF bytes itself, and then transform each block write into a block write+DIF write.

Hinting

In certain embodiments, the application or user may provide hints to the storage as to information access. In some embodiments, the hinting may be to describe that data may not be accessed for a period of time. In other embodiments, this may be to tell the storage system that data may be accessed on a regular basis, such as with the indices of a database. In further embodiments, the Virtual Storage Layer may translate this hinting information to determine at what tier of storage on the storage array the extent or extents corresponding to the hint should be stored.

Explicit Hinting

In some embodiments, the current disclosure utilizes an extent-based hinting interface that may allow a higher-level application to provide the extent service provider with application-level knowledge that will allow it to optimize the service that it provides to the extent. In certain embodiments, a backup-application may use this hinting interface to indicate the start of a large series of sequential read operations against a series of extents. Likewise, a virtual machine hypervisor that has just been instructed to shutdown a virtual machine may use a storage hint to tell the storage extent provider that the storage used by the virtual machine is unlikely to be used in the near future, allowing the storage extent provider to better optimize its resources.

In a particular embodiment, a hit may be sent that includes a list of extents. The hit may note that the list of extents may be used for a set of test data. The hint may request that the list of extents, corresponding to the set of test data, be transferred to tier 1 or highly accessible storage. The virtual storage layer may make a determination whether to act on the hint. Based on a positive determination, the virtual service layer may translate the list of extents received in the hint and translate them into the corresponding extents at the physical storage level. The virtual storage level may made then request that the storage move the corresponding physical extents to highly accessible or tier 1 storage.

Figure 14:
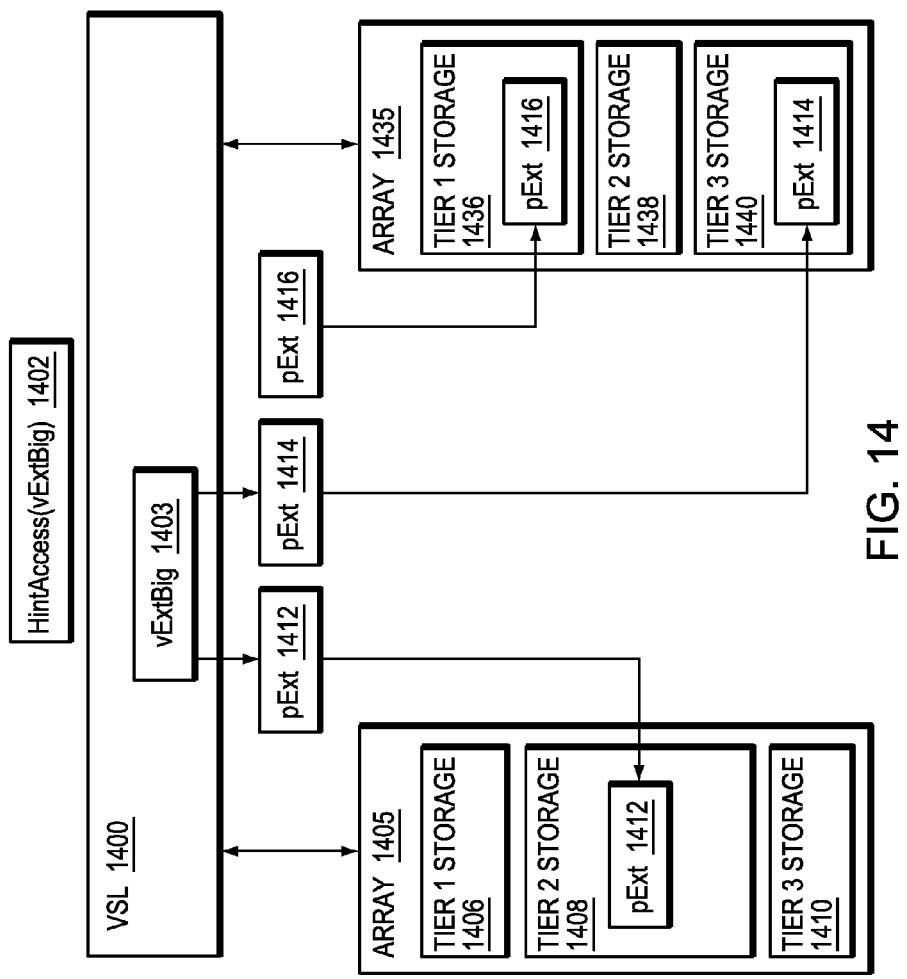
FIG. 14 is a simplified embodiment of a hint at a virtual storage layer, in accordance with an aspect of the current invention.
Figure 15:
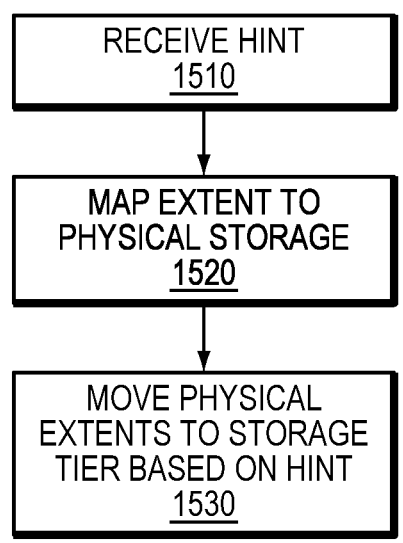
FIG. 15 is a simplified method of implementing a hint, in accordance with an aspect of the current invention.
Figure 16:
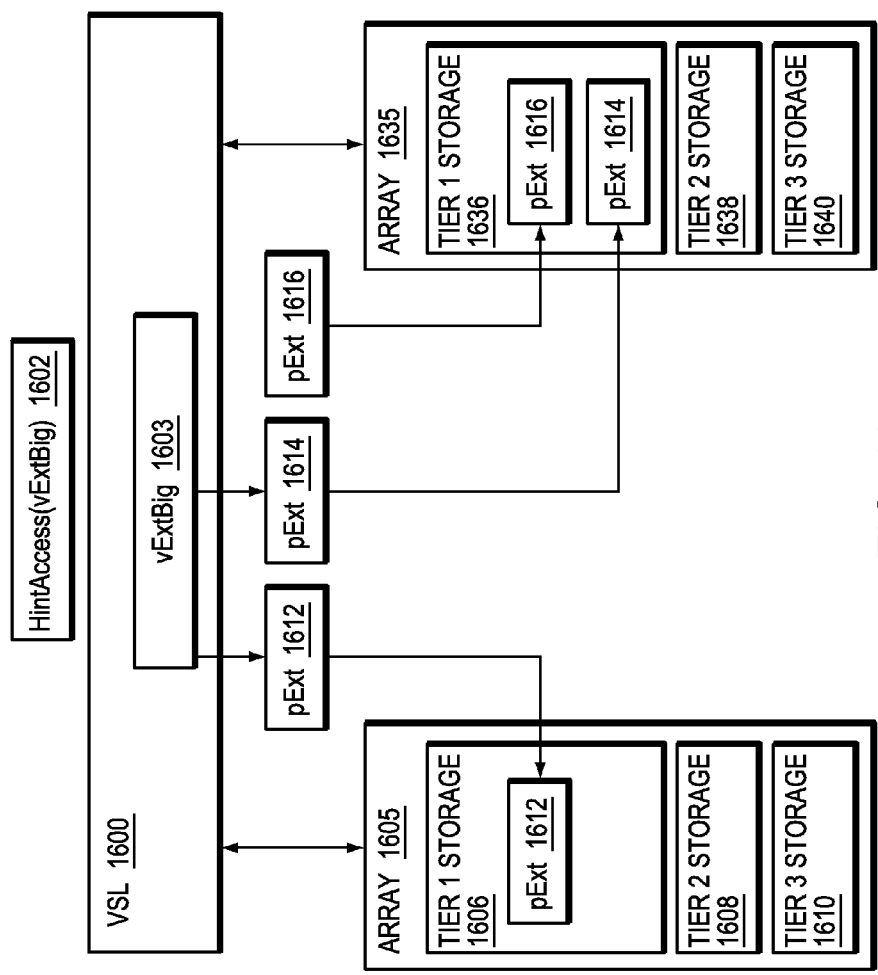
FIG. 16 is an alternative simplified embodiment of a hint at a virtual storage layer, in accordance with an aspect of the current invention.

For example, refer now to the example embodiments of FIGS. 14-16. FIG. 14 illustrates a hint 1402 that a particular extent 1403 may be accessed regularly for a given time period and that this extent should be stored in tier 1 or quickly accessible storage. The VSL 1400 may receive the hint 1402 (step 1510). VSL 1400 may map the virtual extent 1403 to underlying physical extents 1412, 1414, 1416 (step 1520). The VSL 1400 may instruct the storage arrays to move the physical extents 1412, 1414, and 1416 to tier one storage based on the hint (step 1530). In FIG. 14, extent 1412 is located on tier 2 storage 1408, physical extent 1414 is located on tier 3 storage 14140, and extent 1416 is located on tier 1 storage 1436. After the move is executed, physical extent 1612 is resident on Tier 1 storage 1605 and physical extents 1614 and 1616 are located on tier 1 storage 1636.

Implicit Hinting

In further embodiments, when direct hinting input is not available through this interface, I/O to extents may be observed to have the identifying characteristics of application objects such as MP3 files, database files, tables, indexes and temporary files unique to a number of application vendors. In some embodiments, I/O's with the same qualifying characteristics may be inferred to be observations of the same object, and their target extent locations mapped to be a fluid definition of the object on storage media. In other embodiments, for storage tiering purposes, complete application extent mapping accuracy may not be considered a requirement, so the fluid definitions may be the result of both direct hinting and object inference may provide the benefits of tiering without risk to data integrity.

In some embodiments, sampled IO payload to certain extents may be observed to have the characteristics of MP3 files. In these embodiments, the VSL may choose to store any such range of extents on SATA storage tiers for best alignment of the object type with the cost and performance of underlying storage."

Figure 17:
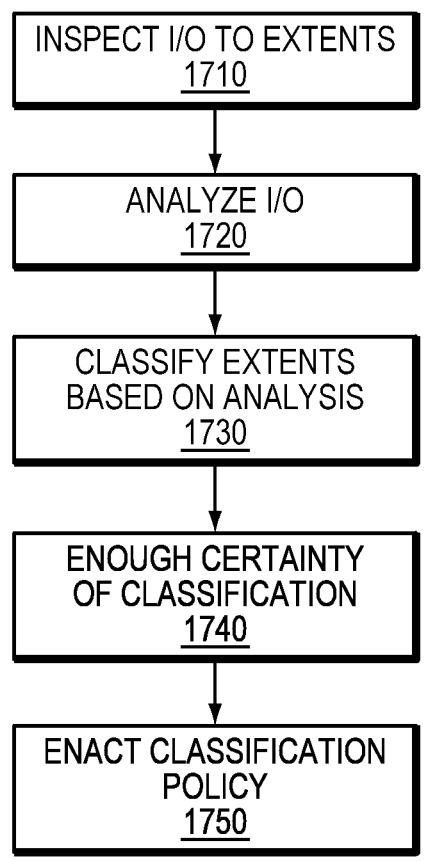
FIG. 17 is a simplified method of implementing implicit hinting, in accordance with an aspect of the current invention.
Figure 18:
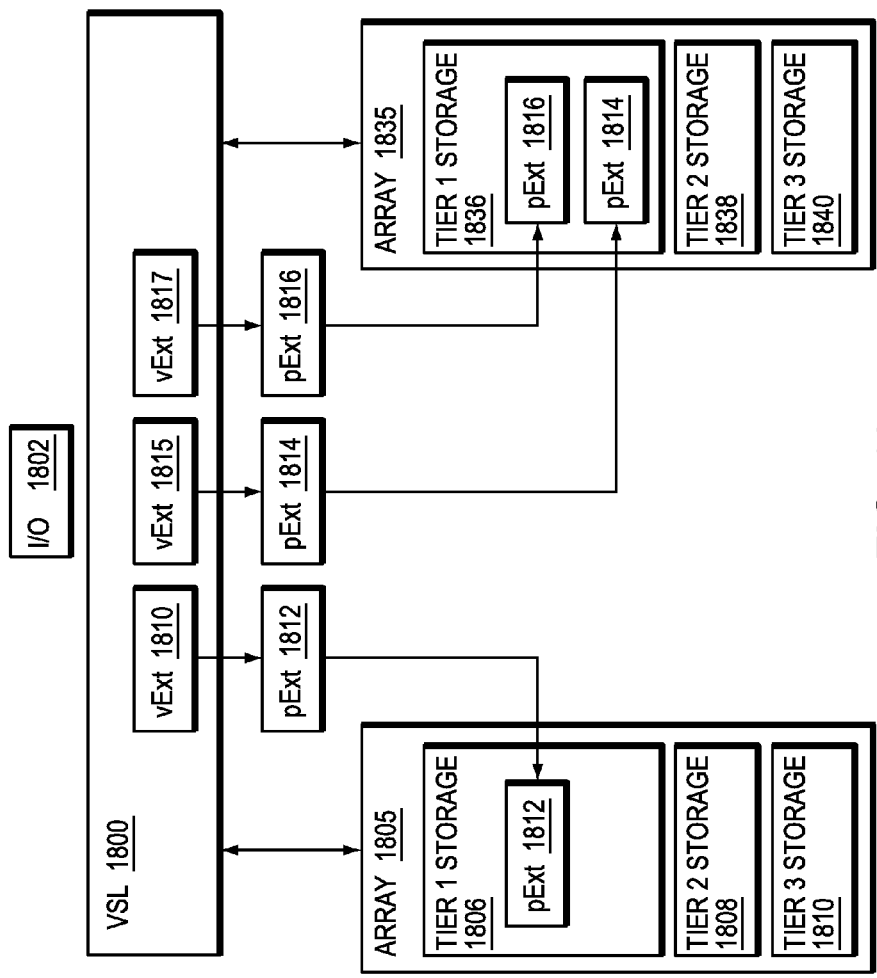
FIG. 18 is a simplified embodiment of implicit hinting at a virtual storage layer, in accordance with an aspect of the current invention.

Refer now to the sample embodiments of FIGS. 17 and 18. Selected I/O 802 to extents 1810, 1815, and 1817 is inspected (step 1710), for example based on a sample survey. The payload of the I/O to the selected extents is analyzed, in some embodiments against known characteristics of object types (step 1720). The extents are classified to be a type of extent within a given statistical error range (step 1730). A determination is made of the level of certainty of the classification (step 1740). Given a sufficient level of certainty, a user-defined storage policy is enacted for the range of extents to which the sample survey applies (step 1750). In some embodiments, the classification policy may move the extents to a different tier of storage based on the user policy.

The methods and teachings described herein serve to both preserve and optimize the capabilities and values of the virtualized storage platforms, affording customers both continued and improved ROI of those assets.

Figure 19:
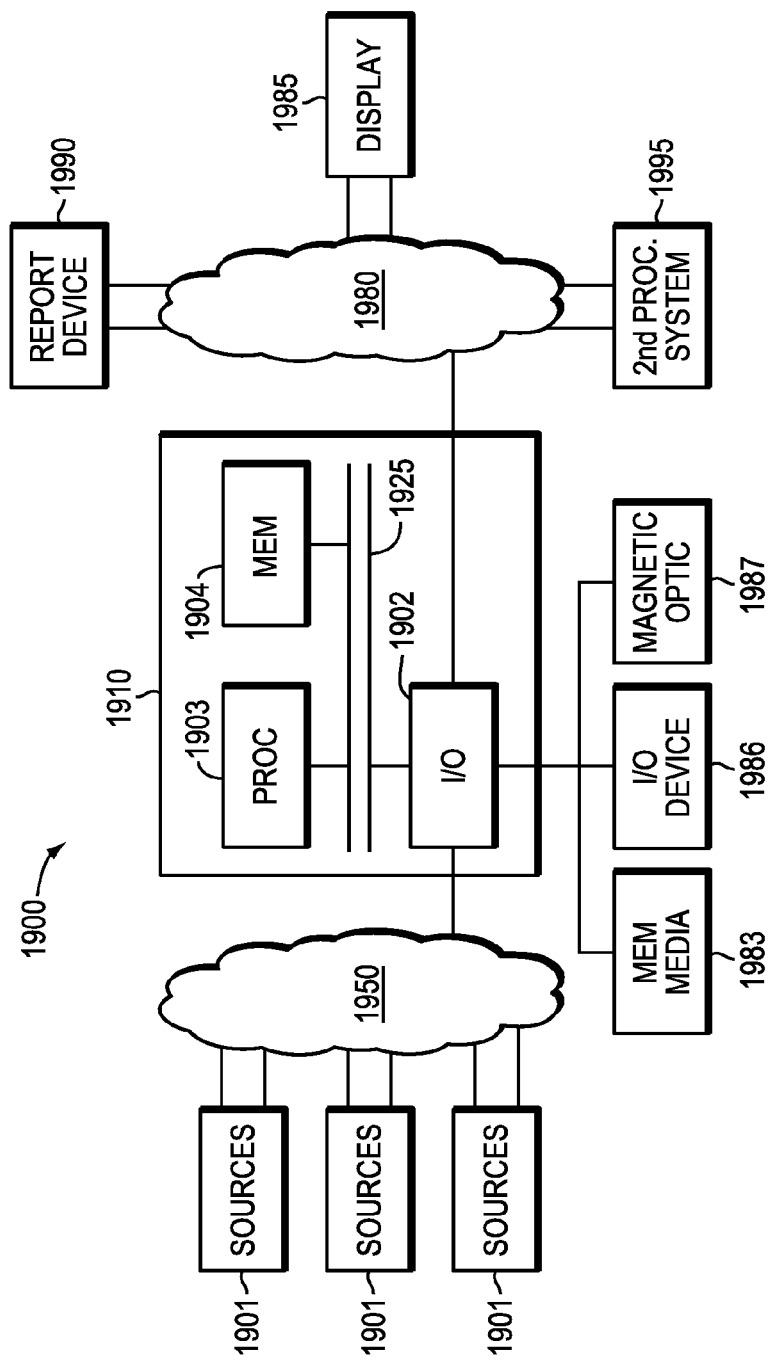
FIG. 19 is an illustration of a computer with program logic, in accordance with an embodiment of the present invention.
Figure 20:
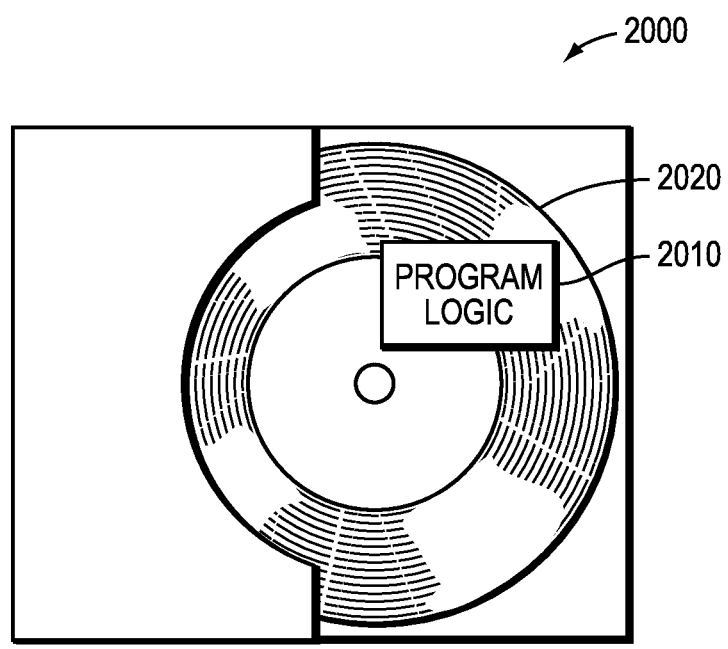
FIG. 20 is an embodiment of the current invention as embodied in program code.

The methods and apparatus of this invention may take the form, at least partially, of program code (i.e., instructions) embodied in tangible, non-transitory media, such as floppy diskettes, CD-ROMs, hard drives, random access or read only-memory, or any other machine-readable storage medium. When the program code is loaded into and executed by a machine, such as a computer of FIG. 19, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 20 shows Program Logic 2034 embodied on a computer-readable medium 2030 as shown, and wherein the Logic is encoded in computer-executable code configured for carrying out the reservation service process of this invention and thereby forming a Computer Program Product 2000.

The logic for carrying out the method may be embodied as part of the system described below, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer implemented method to enable a virtual storage layer to offer array based extent services, the virtual storage layer communicatively coupled to one or more storage mediums, the method comprising:
   determining for the one or more storage mediums, the services offered by the storage mediums; and
   enabling extent based services at the virtual service layer by combining the services offered by the one or more storage mediums to create new services and by providing a set of services at the virtual service layer; wherein the virtual service layer enables the extent based services by translating a request for an extent based service of the extent based services applied to a virtual extent by mapping the virtual extent to the one or more physical extents that make up the virtual extent; wherein the virtual service layer translates the request for the extent based service to include one or more services to be applied to the physical extents; wherein the virtual service layer coordinates the ability to execute the one or more services before executing the one or more services to be applied to the physical extents.

2. The method of claim 1 wherein the one more storage mediums have tiers of storage levels and the virtual service layer leverages a hint to determine what extents of the one or more storage mediums should be stored at what tier of storage level of the one or more storage mediums.

3. The method of claim 1 wherein the one more storage mediums have tiers of storage levels and the virtual service layer monitors what physical extents are accessed to create an implicit hint based on the access, and further wherein the virtual storage layer determines what physical extents should be stored at what tier of storage levels of the one or more storage mediums based on the implicit hint.

4. The computer implemented method of claim 1 wherein one of the extent based services enabled at the virtual service layer is a data integrity service; wherein the data integrity service includes generating a data integrity field for an extent.

5. The computer implemented method of claim 1 wherein one of the extent based services enabled at the virtual service layer is creation of a mirror; wherein the mirror mirrors a created extent across two storage mediums.

6. The computer implemented method of claim 1 wherein one of the extent based services enabled at the virtual service layer is encryption of the data stored on an extent.

7. The computer implemented method of claim 1 wherein one of the extent based services enabled is zeroing of an extent.

8. A computer program product comprising:
   a non-transitory computer readable medium encoded with computer executable program code to enable a virtual storage layer to offer array based extent services, the virtual storage layer communicatively coupled to one or more storage mediums, the code enabling:
   determining for the one or more storage mediums, the services offered by the storage mediums; and
   enabling extent based services at the virtual service layer by combining the services offered by the one or more storage mediums to create new services and by providing a set of services at the virtual service layer; wherein the virtual service layer enables the extent based services by translating a request for an extent based service of the extent based services applied to a virtual extent by mapping the virtual extent to the one or more physical extents that make up the virtual extent; wherein the virtual service layer translates the request for the extent based service to include one or more services to be applied to the physical extents; wherein the virtual service layer coordinates the ability to execute the one or more services before executing the one or more services to be applied to the physical extents.

9. The computer program product of claim 8 wherein the one more storage mediums have tiers of storage levels and the virtual service layer leverages a hint to determine what extents of the one or more storage mediums should be stored at what tier of storage level of the one or more storage mediums.

10. The computer program product of claim 8 wherein the one more storage mediums have tiers of storage levels and the virtual service layer monitors what physical extents are accessed to create an implicit hint based on the access, and further wherein the virtual storage layer determines what physical extents should be stored at what tier of storage levels of the one or more storage mediums based on the implicit hint.

11. A system for enabling a virtual storage layer to offer array based extent services, the virtual storage layer communicatively coupled to one or more storage mediums, the system comprising:
- a virtual service layer;
- one or more storage mediums; and
- computer-executable logic operating in memory, wherein the computer-executable program logic is configured for execution of the following:
- determining for the one or more storage mediums, the services offered by the storage mediums; and
- enabling extent based services at the virtual service layer by combining the services offered by the one or more storage mediums to create new services and by providing a set of services at the virtual service layer; wherein the virtual service layer enables the extent based services by translating a request for an extent based service applied to a virtual extent by mapping the virtual extent to the one or more physical extents that make up the virtual extent; wherein the virtual service layer translates the request for an extent based service of the extent based services to include one or more services to be applied to the physical extents; wherein the virtual service layer coordinates the ability to execute the one or more services before executing the one or more services to be applied to the physical extents.

12. The system of claim 11 wherein one of the extent based services enabled at the virtual service layer is creation of a mirror; wherein the mirror mirrors a created extent across two storage mediums.

13. The system of claim 11 wherein one of the extent based services enabled at the virtual service layer is encryption of the data stored on an extent.

14. The computer program product of claim 8 wherein one of the extent based services enabled at the virtual service layer is a data integrity service; wherein the data integrity service includes generating a data integrity field for an extent.

15. The computer program product of claim 8 wherein one of the extent based services enabled at the virtual service layer is creation of a mirror; wherein the mirror mirrors a created extent across two storage mediums.

16. The computer program product of claim 8 wherein one of the extent based services enabled at the virtual service layer is encryption of the data stored on an extent.

17. The computer program product of claim 8 wherein one of the extent based services enabled is zeroing of an extent.

18. The system of claim 11 wherein one of the extent based services enabled at the virtual service layer is a data integrity service; wherein the data integrity service includes generating a data integrity field for an extent.

19. The system of claim 11 wherein the one more storage mediums have tiers of storage levels and the virtual service layer monitors what physical extents are accessed to create an implicit hint based on the access, and further wherein the virtual storage layer determines what physical extents should be stored at what tier of storage levels of the one or more storage mediums based on the implicit hint.

20. The system of claim 19 wherein the one more storage mediums have tiers of storage levels and the virtual service layer leverages a hint to determine what extents of the one or more storage mediums should be stored at what tier of storage level of the one or more storage mediums.

* * * * *